United States Patent [19]
Davis

[11] 4,079,520
[45] Mar. 21, 1978

[54] LEVEL BUBBLE FOR A GOLF CLUB

[76] Inventor: Carl B. Davis, 3300 S. Oak Ct., Denver, Colo. 80227

[21] Appl. No.: 659,675

[22] Filed: Feb. 20, 1976

[51] Int. Cl.² .................... G01C 9/28; G01C 9/36
[52] U.S. Cl. ................................. 33/334; 33/373; 33/390; 33/384; 273/162 B
[58] Field of Search .................. 33/334, 370–373, 33/384–386, 390; 273/162 B, 163 R, 163 A, 186 A, 186 B; 403/115, 116, 123

[56] References Cited

U.S. PATENT DOCUMENTS

| D. 220,124 | 3/1971 | Powell | 33/373 X |
|---|---|---|---|
| 1,327,171 | 1/1920 | Ruggles | 273/163 R |
| 1,446,164 | 2/1923 | D'Egraud | 403/123 |
| 2,229,194 | 1/1941 | Sklarek | 403/115 X |
| 2,541,366 | 2/1951 | Kennedy | 33/373 |
| 2,723,125 | 11/1955 | Comee | 33/372 X |
| 2,822,614 | 2/1958 | Susinno | 273/163 A X |
| 3,306,618 | 2/1967 | Liljequist | 273/163 R |

FOREIGN PATENT DOCUMENTS

| 865,697 | 2/1953 | Germany | 33/373 |

Primary Examiner—Charles E. Phillips
Attorney, Agent, or Firm—Van Valkenburgh and Lowe

[57] ABSTRACT

A position indicator to properly incline and set a golf club. The indicator includes a positioning head mounted upon a clamp which is secured to the shaft of a golf club. The positioning head includes a cup carrying a spherical level, a bubble in fluid beneath a spherical glass. The glass is marked to center the level bubble and to indicate direction alignment. The connection between the positioning head and the clamp is essentially a ball and socket joint. A lock screw ties the two components together whenever the position indicator is properly set.

4 Claims, 7 Drawing Figures

U.S. Patent  March 21, 1978  4,079,520
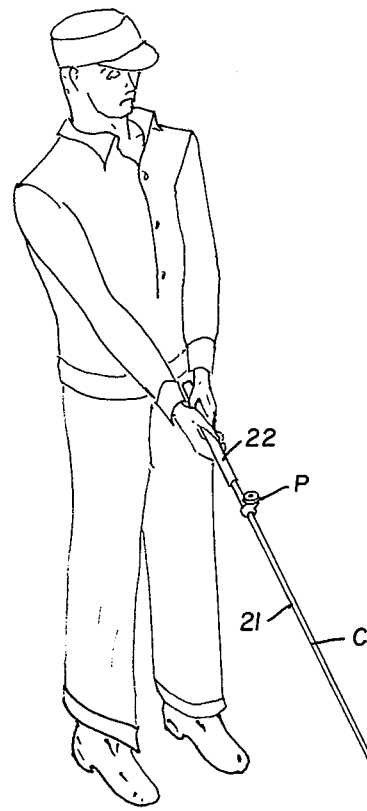
Fig. 1
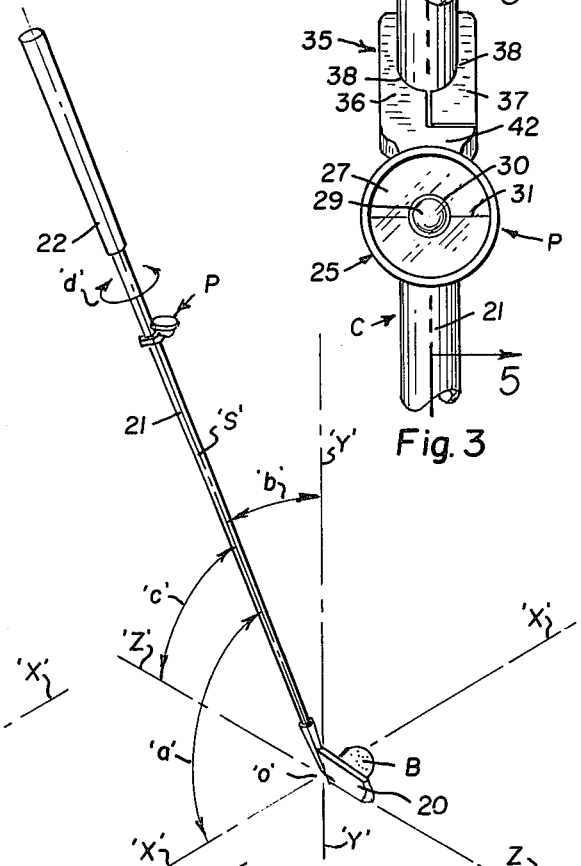
Fig. 2
Fig. 3
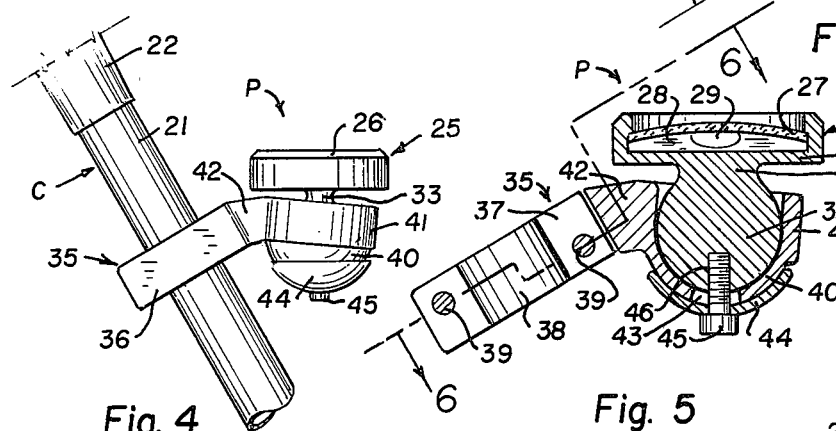
Fig. 4
Fig. 5
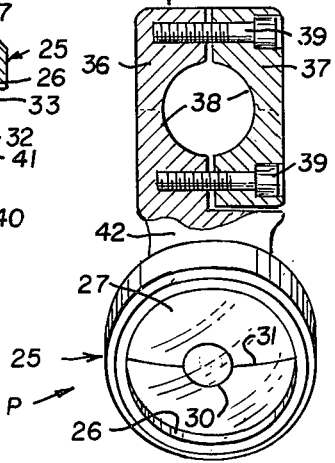
Fig. 6
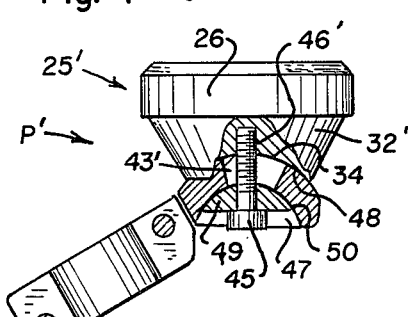
Fig. 7

LEVEL BUBBLE FOR A GOLF CLUB

This invention relates to aids to improve a player's golf game, and more particularly to a position indicator for a golf club which uses a level bubble to simplify the manner in which the golf club is held. Level bubbles have been used with putters; however, the manner in which they have been used is not suitable for swinging clubs, such as woods and irons. The present invention is concerned with swinging clubs and the term "club," as hereinafter appears, will imply such.

A number of devices to aid a golfer in swinging a club have been proposed. Such devices include visual guides to improve the alignment of the club and restraints to control the swing of the club. Some are quite limited in what they can do, some don't really work and others are very cumbersome. None of these devices have proven to be really suitable and there exists a need for an effective device to assist a golfer, and especially a beginner, to properly hold and to properly use his several clubs. The present invention was conceived and developed with this need in view and the invention comprises, in essence, an adjustable spherical level which is attached to a club immediately below the handle at a position where the level can be easily seen.

The present invention is especially useful to the beginner golfer who cannot consistently hold his club in a proper position and who may not even know what a proper position is. More appropriately, the invention is to aid a golfer in assuming a proper stance with respect to a properly positioned club. One ordinarily assumes that the golfer must hold his club properly for a correct shot; however, strictly speaking, this is not so. The club has only one position which it can correctly assume if the ball is to be hit in the right direction and lofted at the correct angle without hooking or slicing. It is the golfer who must position himself correctly with respect to a properly positioned club. Considering the matter from such a viewpoint, it will be found that a golf club must be placed in position alongside the ball so that the striking face of the club behind the ball will be properly inclined and normal to the direction of flight of the ball. When so positioned, the handle of the golf club will be inclined to a given angle with respect to the ground surface. Also, the club must be rotated about its handle to place the head of the club in the correct position.

However, any theoretical consideration as to the proper placement of a club may not interest the average golfer. He will be instructed as to the proper way to hold a club and thereafter, he will use his best judgment in the matter which, sometimes, is not as good as desired. The present invention provides a levelling device which can be mounted onto the handle of a club and adjusted in such a manner as to permit the golfer to take care of all of the complex factors necessary to place the club in a proper position behind a golf ball by a simple observation. With such, the golfer can approach a properly positioned club and position himself correctly with respect to the club for a good, accurate shot.

It follows that an object of the invention is to provide a novel and improved position indicator for a golf club which enables the golfer to assume a proper stance with respect to a properly positioned club.

Another object of the invention is to provide a novel and improved indicator for a golf club which helps the amateur golfer to consistently make accurate shots and eliminate hooks and slices.

Another object of the invention is to provide a novel and improved position indicator for a golf club which quickly forces a beginner to assume a proper stance when using a golf club and also, to swing the club in a proper manner.

Another object of the invention is to provide a novel and improved position indicator which may be easily mounted upon any one of the several different golf clubs the golfer may carry and quickly adjusted to a proper position for the club.

Other objects of the invention are to provide a novel and improved position indicator for a golf club which is a simple, neat appearing, accurate, low cost, rugged and durable unit.

With the foregoing and other objects in view, my present invention comprises certain constructions, combinations and arrangements of parts and elements as hereinafter described, defined in the appended claims and illustrated in preferred embodiment by the accompanying drawing in which:

FIG. 1 illustrates a golfer holding a club in a normal manner with the improved indicator mounted upon the club.

FIG. 2 is a perspective view of a golf club with the indicator mounted thereon and showing diagrammatically, the proper position of the club with respect to a coordinate system based upon the desired direction of ball flight.

FIG. 3 is a plan view of a fragment of the club shown at FIG. 2 and the indicator mounted thereon.

FIG. 4 is a side elevational view of the organization shown at FIG. 3.

FIG. 5 is a sectional view of the indicator per se, as taken from the indicated line 5—5 at FIG. 3, but on an enlarged scale.

FIG. 6 is a sectional plan view of the indicator as taken from the indicated line 6—6 at FIG. 5.

FIG. 7 is a sectional view similar to the FIG. 5, but showing another embodiment of the indicator.

Referring more particularly to the drawing, FIG. 1 shows a golfer holding one of his clubs C in position for driving a ball B. The golfer will have a number of different clubs, for example, two or three "woods" and five or six "irons." Each of the clubs is of a different length, has a different face angle at its head and is for a different type of a shot. For example, the driver, a "wood," is a long handled club best suited for distance with the face angle of the head being nearly vertical to drive the ball at a flat angle above the ground. In contrast, the nine-iron, a shorter club, is suited for short shots. The face angle of the head of the nine-iron is inclined backwards from the lower edge of the face to loft the ball upwardly at a steep angle and with a reverse spin to drop as onto a green, with a minimum roll after it hits the ground.

In many ways, each club is similar to the others, but also, in other ways, each club is quite different from the others. For example, the clubs must be held at different angles because of the differences in shaft length and also because of the differences in the angle of the shaft of a club with respect to the face of its head. As heretofore mentioned, the present invention is an indicator to place a club in a proper position with respect to the ball and the direction it is to be hit. The golfer can easily grasp the properly positioned club in a proper manner and place himself at the proper position with respect to the club.

The geometry of placing a club at a proper position with respect to a ball is indicated at FIG. 2 and is briefly described to better appreciate the simplicity of the present invention. A typical club C includes a head 20, a shaft 21 and a handle 22 at the upper end of the shaft. The position of this club can be described with respect to orthographic coordinates, the origin 'o' being selected at the ground level, at a point through which the axis 's' of the shaft passes. The flight coordinate 'X'—'X' refers to the direction which the ball is to be hit. The other coordinates include the vertical 'Y'—'Y' coordinate and the transverse 'Z'—'Z' coordinate. The proper specified position of the axis of the club C can then be defined by the directional angles, that is, the angle 'a' between the shaft axis and the 'X'—'X' coordinate, the angle 'b' between the shaft axis and the 'Y'—'Y' coordinate and the angle 'c' between the shaft axis and the 'Z'—'Z' coordinate. It is to be noted that the angle 'a' may be 90° and if so, the shaft of the club will lie in the transverse vertical plane defined by the 'Y'—'Y' and 'Z'—'Z' axes. This is often the case, but it is not essential that the club lie in this transverse plane. In any event, a horizontal line at the face of the head, the strike, must be placed parallel to the 'Z'—'Z' axis when the club is properly positioned if the ball is to soar in the direction of the 'X'—'X' axis where it is hit. This placement of the head of the club is accomplished by rotating the club as about the shaft axis 's' as in the manner indicated at 'd'.

It is apparent that no golfer will take the trouble to position a golf club by any such complicated measurements but, as is universally done, he will position his club by intuition, from the results of experience and from instruction. However, simple measurements will show that even an experienced golfer is not consistent in the manner in which he holds and places his club when preparing for a shot. There is a real and definite need for a simple, easily used device to assist golfers, especially beginners, in properly holding the several varied clubs.

The present invention is a position indicator P which is affixed to the shaft 21 of the club, adjacent to the handle 22, and it includes a levelling device to require that the club be properly inclined and rotated to a correct position for hitting a ball. The indicator is marked to better establish the direction in which the ball is to be hit. Preferably, the position indicator P is adapted to be mounted upon any selected golf club, as from a driver to a seven-iron, and it is thus formed as two components, a levelling device, a positioning head 25 and a shaft mount 35 which adjustably carries the head 25.

In the embodiment shown at FIGS. 3 - 6, the positioning head 25 includes a flat, circular, shallow cup 26 wherein a spherical level glass 27 is mounted to form a simple level. Fluid 28, which may be colored, partially fills the cup cavity beneath the glass 27 to form a bubble 29. The glass 27 is marked with a center circle 30 and a direction line 31 extending from each side of the circle 30, as best shown at FIG. 3. It is to be noted that the diameter of the level bubble 29 will be slightly less than the diameter of the indicator circle 30 on the level glass 27. To complete this head 25, a spherical base 32 extends beneath the cup, preferably in axial alignment therewith, and may be joined to the cup as by a neck 33 as illustrated. This base thus forms the ball of a ball and socket joint, as hereinafter further described.

The shaft mount 35 includes a clamp arm 36 and an opposing clamp bar 37. These clamp members fit together with each being channeled as a half-circle to define a passageway 38 through which the shaft 21 of a club will extend. Lock screws 39, preferably of a type having a recessed head, such as Allen head screws, interconnect the clamp arm 36 and bar 37 and pull these members together to tightly grip the shaft of a club. This grip must be very tight because once set, slipping or other movement of the shaft mount upon the shaft of the club cannot be permitted. To assure this, the clamp arm and bar are spaced apart slightly when they are clamped upon a club shaft as best shown at FIG. 3.

A boss 40, formed as a spherical cup, the socket of the ball and socket joint heretofore mentioned, is connected to the clamp arm 36 and is proportioned to receive the spherical base 32 of the head 25. A rim portion 41 extends about the top of the cup 40 and forms a down-turned handle 42 to connect with the clamp arm 36 at an inclination approximating the average position inclination of a set of clubs to minimize the tip necessary to adjust the head 25 within the shaft mount 35 for different clubs. To secure the base 32 within the cup, an orifice 43 extends through the bottom of the cup 40, a spherical washer 44 embraces the underside of the cup and a lock screw 45 extends through the washer, through the orifice 43 and into an axially centered, tapped socket 46 in the spherical base 32. The orifice 43 is substantially larger in diameter than the diameter of the lock screw 45 so that the head 25 may be tipped and rotated in the cup of the shaft mount 35 to any desired position, the ball and socket movement. The spherical base 32 is locked in the cup 40 by tightening the lock screw 45.

The setting of the position indicator P upon a golf club is a simple operation. A stand may be provided for a given club which sets the club precisely with respect to a given direction of ball flight, the heretofore mentioned 'X'—'X' axis. The shaft mount 35 is first secured to the club shaft 21, as at a selected position below the handle 21 with the mount being turned so that the head 25 will be near the ridge of the inclined club at an easy-to-see position. When the lock screws 39 tightly lock this mount 35 upon the club shaft 21, the head 25 is shifted until the level bubble 29 is within the circular marker 30. Next, the head 25 is rotated until the direction line 31 is aligned with the direction of ball flight, the 'X'—'X' axis. The lock screw 45 is then tightened to affix the head 25 in the mount 35. The club is then ready for use. The indicator P may be set in other ways. For example, it may be set at an approximate position and thereafter adjusted through a series of test swings by the golfer until he positions the level to suit his particular needs.

The use of the club with this level indicator L in place requires that the golfer set the club with the bubble 29 within the circular marker 30 and with the direction line 31 in the desired direction of the ball flight. This automatically requires the golfer to assume a proper stance and club grip. An unexpected result occurred during practice swings in that it was discovered that whenever a properly held club was properly swung, the level bubble 30 could actually be easily seen by the golfer during the bottom of the swing and if the swing was proper, the level bubble would be centered on the line marker 31 or be within the circular marker 30. The centrifugal forces during a proper swing actually kept the level bubble in position. Thus, a golfer knows whether or not he is swinging correctly, a significant aid for a beginner golfer.

A modified embodiment, a position indicator P', is formed with a variation of the ball and socket connection between a level head 25' and the shaft mount 35'. The level head 25' includes a circular shallow cup 26 with a marked, spherical level glass therein to retain liquid and a bubble the same as hereinbefore described. A modified base 32' is provided, however, which depends directly from the underside of the cup 26 and the bottom of this base 32' is formed as a spherical cavity 34.

The shaft mount is formed with a clamp arm 36, not shown, a clamp bar 37, a passageway 38 in the clamp arm and bar, and lock screws 39, all to secure the mount upon a club shaft 21 the same as hereinbefore described. An upturned, hemi-spherical boss 47 outstands from an inclined handle, not shown, which connects the clamp arm, the same as heretofore described. The upper surface 48 of the boss 47, which is approximately a hemisphere, is proportioned to fit into the cavity 34 of the level head 25'. A washer 49 has a spherical segment at its upper side to fit into a spherical cavity 50 at the underside of the boss 47 and a lock screw 45 extends through this washer 49, through an enlarged orifice 43' in the boss 47 and into a threaded socket 46' at the center of the spherical cavity 34, as illustrated.

The mounting, adjusting and the use of this modified leveller L', is the same as heretofore described.

I have now described my invention in considerable detail. However, it is obvious that others skilled in the art can build and devise alternate and equivalent constructions which are nevertheless within the spirit and scope of my invention. Hence, I desire that my protection be limited not by the constructions illustrated and described, but only by the proper scope of the appended claims.

What is claimed is:

1. In combination a position indicator mounted upon the shaft adjacent the handle of a golf club of the type normally used to loft a ball, to incline and position the golf club prior to swinging, comprising:
   a. a cup-shaped positioning head carrying a universal type level indicator; said level indicator comprising a bubble in fluid beneath a section of a spherical glass, a circular marker centered on the glass to indicate the level position of the bubble and a line marker on the glass bisecting said circular marker to indicate direction; and
   b. a mount means having a clamp to grip the club shaft and a boss to hold the positioning head, said clamp includes a clamp arm and an opposing clamp bar which are secured together; wherein the clamp can be adjustably tightened to permit rotative adjustments of the mount means about the shaft;
   wherein the connection between the boss and the positioning head is a ball and socket type joint to permit tippable and rotative adjustments of the head upon the boss;
   said boss is a cup having a hemispherical cavity and the positioning head includes;
   a spherical base adapted to be fitted into the cup; said cup includes:
   a hemispherical, outer surface;
   a washer formed as a spherical segment fitted against the exterior of the cup;
   an orifice at the base of the cup;
   wherein a lock means is associated with the boss and the head to lock the head in position upon the boss;
   said lock means includes a lock screw extended through the washer, through the orifice and into the spherical base, and wherein the orifice is larger in diameter than the diameter of the lock screw to permit position adjustments between the head and boss; and
   whereby the golf club is placed with the hancle at a selected proper inclination and rotated to position the head of the club for hitting a ball in the desired direction of flight and the clamp means and the positioning head are rotated and tilted to indicate the proper position for holding the club prior to swinging it for hitting the golf ball, the bubble will be juxtaposed with the circular marker and the line marker will be aligned with the direction of flight to thereby provide a predetermined proper setting for repeatedly properly positioning the club.

2. The position indicator defined in claim 1, wherein said direction marker is adapted to indicate a proper swing of the club whenever the level indicator indicates level along the course of the direction marker.

3. In combination a position indicator mounted upon the shaft adjacent the handle of a golf club of the type normally used to loft a ball, to incline and position the golf club prior to swinging, comprising:
   a. a cup-shaped positioning head carrying a universal type level indicator; said level indicator comprising a bubble in fluid beneath a section of a spherical glass, a circular marker centered on the glass to indicate the level position of the bubble and a line marker on the glass bisecting said circular marker to indicate direction; and
   b. a mount means having a clamp to grip the club shaft and a boss to hold the positioning head; said clamp includes a clamp arm and an opposing clamp bar which are secured together;
   wherein the clamp can be adjustably tightened to permit rotative adjustments of the mount means about the shaft;
   wherein the connection between the boss and the positioning head is a ball and socket type joint to permit tippable and rotative adjustments of the head upon the boss;
   said boss has a hemi-spherical upper surface and said cup has a spherical cavity adapted to shiftably seat upon this upper surface;
   said boss includes a spherical cavity at its undersurface;
   a washer having a spherical upper surface fitted into the spherical cavity;
   an orifice through the boss;
   wherein a lock means is associated with the boss and the head to lock the head in position upon the boss;
   said lock means includes a lock screw extended through the washer, through the orifice and into the cup, and wherein the orifice is larger in diameter than the diameter of the lock screw to permit position adjustments between the head and boss; and
   whereby when the golf club is placed with handle at a selected proper inclination and rotated to position the head of the club for hitting a ball in the desired direction of flight and the clamp means and the clamp means and the positioning head are rotated and tilted to indicate the proper position for holding the club prior to swinging it for hitting the golf ball, the bubble will be juxtaposed with the circular marker and the line marker will be aligned with the direction of flight to thereby provide a predetermined proper setting for repeatedly properly positioning the club.

4. The position indicator defined in claim 3, including:
   a direction marker associated with the level indicator adapted to indicate the proper direction for placement of the club and to indicate a proper swing of the club whenever the level indicator indicates level along the course of the direction marker.

* * * * *